(12) United States Patent
Wormely

(10) Patent No.: US 7,401,290 B2
(45) Date of Patent: Jul. 15, 2008

(54) INHIBITING HYPENATION CLUSTERS IN AUTOMATED PARAGRAPHS LAYOUTS

(75) Inventor: Matthew A. Wormely, San Luis Obispo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1215 days.

(21) Appl. No.: 09/799,195

(22) Filed: Mar. 5, 2001

(65) Prior Publication Data

US 2002/0124023 A1    Sep. 5, 2002

(51) Int. Cl.
*G06F 17/26*    (2006.01)

(52) U.S. Cl. .................. 715/247; 715/243; 715/251; 715/253

(58) Field of Classification Search .............. 715/500, 715/508, 517, 518, 519, 520, 521, 523, 525, 715/526, 539, 200, 243, 247, 251, 253
See application file for complete search history.

(56) References Cited

U.S. PATENT DOCUMENTS

| | | | | |
|---|---|---|---|---|
| 3,579,193 | A * | 5/1971 | Bernier | 358/1.1 |
| 3,654,611 | A | 4/1972 | Bluethman et al. | |
| 4,575,813 | A | 3/1986 | Bartlett et al. | |
| 4,587,631 | A | 5/1986 | Nielsen et al. | |
| 4,608,664 | A | 8/1986 | Bartlett et al. | |
| 5,043,936 | A * | 8/1991 | Majima | 715/519 |
| 5,224,038 | A | 6/1993 | Bespalko | |
| 5,625,773 | A * | 4/1997 | Bespalko et al. | 345/467 |
| 5,737,621 | A * | 4/1998 | Kaplan et al. | 715/531 |
| 5,835,920 | A | 11/1998 | Horton | |
| 5,978,819 | A | 11/1999 | Berstis | |
| 6,018,749 | A | 1/2000 | Rivette et al. | |
| 6,044,383 | A | 3/2000 | Suzuki et al. | |
| 6,189,020 | B1 | 3/2001 | Shimizu | |
| 6,223,191 | B1 * | 4/2001 | Truelson | 715/517 |
| 6,279,018 | B1 | 8/2001 | Kudrolli et al. | |
| 6,510,441 | B1 * | 1/2003 | Kenninga | 715/521 |
| 6,948,119 | B1 | 9/2005 | Farmer et al. | |
| 2003/0055851 | A1 * | 3/2003 | Williamson et al. | 707/515 |

OTHER PUBLICATIONS

Peels et al., "Document Architecture and Text Formatting", ACM Transactions on Information Systems (TIOS), vol. 3, Issue 4, Oct. 1985, pp. 347-369.*

Craig, "Controlling Wordspacing," *Photo Type Setting*, Malmstrom (ed.), Watson-Guptill Publications/New York, 1978 (Table of Contents).

Craig, "Controlling Wordspacing,", *Photo Type Setting*, Malmstrom (ed.), Watson-Guptill Publications/New York, 1978, pp. 76-77.

Knuth, *Computers & Typesetting—TEX: The Program*, Addison-Wesley, Boston, MA 1986, Sections 813-966 (Table of Contents).

(Continued)

*Primary Examiner*—Stephen Hong
*Assistant Examiner*—Gregory J. Vaughn
(74) *Attorney, Agent, or Firm*—Fish & Richardson P.C.

(57) ABSTRACT

Methods and apparatus for inhibiting hyphenation clustering. In one aspect, the invention identifies a sequence of consecutive text lines, one or more of which end in hyphens, and calculates a hyphenation penalty value based on the number and proximity of hyphens within the sequence consecutive text lines. The hyphenation penalty can be aggregated with other format penalties to aid the identification of a paragraph layout having a best overall visual appearance.

25 Claims, 1 Drawing Sheet

OTHER PUBLICATIONS

Knuth, *Computers & Typesetting—TEX: The Program*, Addison-Wesley, Boston, MA 1986, Sections 813-966, pp. 343-406.

Iwai, et al., "A Document Layout System Using Automatic Document Architecure Extraction", ACM SIGCHI Bulletin, vol. 20, Issue S1, Mar. 1989 pp. 369-374.

Peels, et al. "Document Architecture and Text Formatting", ACM Transaction on Information Systems (TOIS), vol. 3, Issue 4, Oct. 1985, pp. 347-369.

Knuth et al., "Breaking Paragraphs into Lines," *Software-Practice and Experience*, vol. 11,, pp. 1119-1184, Feb. 1981.

Stephens, "Ready-to-Run, Visual Basic Algorithms," Second Edition, *Wiley Computer Publishing*, pp. 117-153, 155-185.

URW hz-program, "Micro-typography for advanced typesetting," *URW Software & TypeGmbH*, Hamburg, Germany, 1993, 1-38.

* cited by examiner

INHIBITING HYPENATION CLUSTERS IN AUTOMATED PARAGRAPHS LAYOUTS

BACKGROUND

The invention relates to inhibiting hyphenation clusters in automated paragraph layouts.

Paragraph layout in a document production application involves selection of various format parameters so as to give the paragraph a visually pleasing appearance. Format parameters which significantly affect the aesthetic quality of a paragraph include line breaks, widow-orphan control, hyphenation, and paragraph shape. Any combination of such format parameters can cause a paragraph to have a visually unappealing appearance. It is therefore desirable to control the manner in which those formats are applied to a paragraph to ensure that the paragraph has an optimally attractive layout.

A number of techniques exist to control the impact of hyphenation on the overall appearance of a paragraph. Some text layout optimization programs eliminate the use of hyphenation altogether, but such an approach completely sacrifices the formatting flexibility afforded by hyphenation. Other programs permit the user to define the number of consecutive hyphens permitted in a paragraph layout, completely precluding the use of consecutive hyphens beyond that prescribed number. Still other programs assess format penalties based upon the total number of hyphens and the number of consecutive hyphens in a selected paragraph layout, thereby favoring paragraph layouts with the lowest hyphenation penalty.

SUMMARY

The invention is directed to a system, method, and computer-readable medium for inhibiting hyphenation clusters in paragraph layouts, especially automated paragraph layouts.

In general, in one aspect, the invention identifies a layout having multiple consecutive text lines, identifies the text lines that end in a hyphen, and then assigns to the layout a hyphenation penalty value which is a function of both the number and proximity of non-consecutive text lines ending in hyphens.

In another aspect, hyphenation penalty values are assigned to a series of alternate layouts and the layout having the lowest hyphenation penalty value is selected.

In an additional aspect of the invention, hyphenation penalties are assigned to each line in a paragraph, an aggregate hyphenation penalty is assigned to the paragraph, and then other potential paragraph layouts are examined in a like manner to determine which has the lowest aggregate hyphenation penalty value.

In a further aspect of the invention, the aggregate hyphenation penalty assigned to each layout is combined with one or more penalty values associated with other format parameters such as line breaks, paragraph shape, and widow/orphan control so that the paragraph layout having the best overall appearance can be selected.

In another aspect of the invention, the user can select the number of consecutive text lines which are examined at one time to control the distance over which hyphenation clustering is controlled.

In still a further aspect, the invention includes the steps of identifying a line in a paragraph, amending a pattern sequence such that it reflects the presence or absence of a hyphen at the end of the line, assigning to the line a hyphenation penalty which is a function of the number and proximity of non-consecutive hyphens reflected by the pattern sequence, identifying the next line in the paragraph, repeating the foregoing steps until the end of the paragraph is reached, and then assigning to the paragraph an aggregate hyphenation penalty value which is a function of the hyphenation penalties assigned to each line in the paragraph.

The invention can be implemented to realize one or more of the following advantages. The invention can help a user to avoid paragraph layouts which, while having an acceptable number of consecutive hyphens and an acceptable total number of hyphens, have a visually displeasing degree of hyphenation clustering. Appropriate selection of hyphenation penalties for various hyphenation patterns permits customization of the relative weight given to the number, consecutiveness, and proximity of hyphens in determining an optimal paragraph layout. The invention can also enable users to control the sensitivity of layout optimization programs to hyphenation proximity or clustering. The invention can be readily combined with other format penalty techniques to provide a system for evaluating the true overall visual appeal of a paragraph.

The details of one or more embodiments of the present invention are set forth in the accompanying drawings and the description below. Other features and advantages of the present invention will be apparent from the description and drawings, and from the claims.

DETAILED DESCRIPTION

Figure 1:
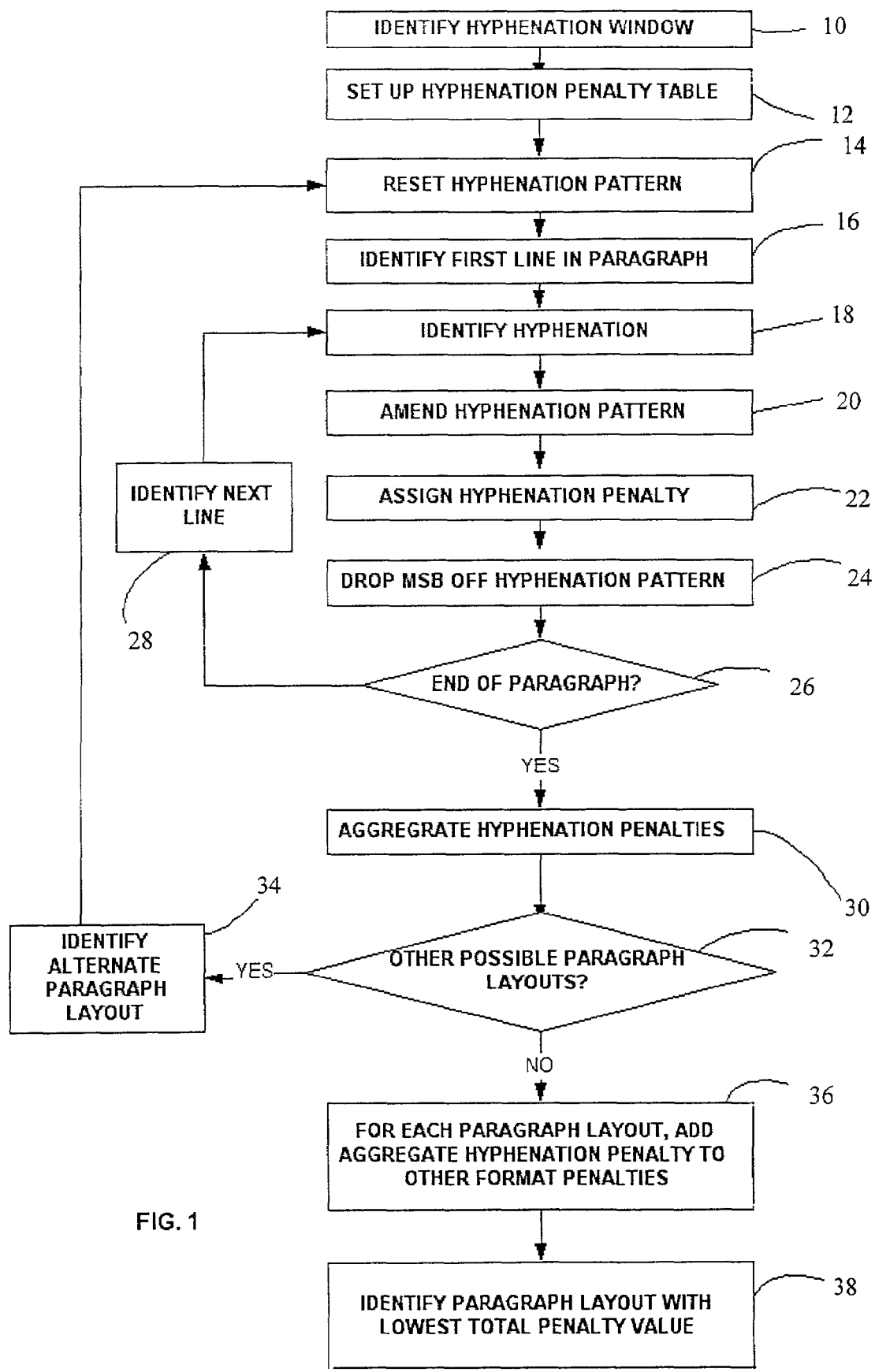
FIG. 1 is a flow diagram illustrating a technique for inhibiting hyphenation clustering in an automated paragraph layout.

FIG. 1 illustrates an embodiment of the instant invention adapted for implementation in a computer program product tangibly stored in a machine-readable storage device. According to the technique of FIG. 1, the user selects the number of lines across which hyphenation will be detected, also called the hyphenation window. The lines within that window are then examined to determine which end in hyphens. Lines ending in a hyphen are assigned a hyphenation value of 1 and other lines are assigned a value of zero. The hyphenation values of successive lines are grouped together to form a hyphenation pattern. For example, a sequence of seven lines in which the first, fourth and fifth end in hyphens would have a hyphenation pattern of 1001100. There is a predetermined hyphenation penalty associated with each possible hyphenation pattern. The predetermined penalties are higher for patterns reflecting tighter clusters of hyphens, even if the hyphens are not at the end of consecutive lines. The penalties are proportional to the proximity of both the consecutive and the non-consecutive hyphens. The predetermined penalties are also higher for patterns containing a greater number of total hyphens or a greater number of consecutive hyphens. The precise pattern of the hyphens in the hyphenation window thus dictates the hyphenation penalty. The hyphenation penalty can be combined with penalties associated with line breaks, paragraph shape, widow-orphan control or other format parameters to obtain an total format penalty. Various possible formats can be analyzed, penalized and compared with one another to determine which has the lowest hyphenation penalty or the lowest total penalty value.

Steps 10-38 of FIG. 1 will now be described in more detail. A user selects a hyphenation window, which corresponds to the lines across which hyphenations are detected (10). The user inputs a numeric value representing the number of lines in the hyphenation window. In the example above (i.e., 1001100), the hyphenation window is seven lines tall. As will be described in more detail, the window is effectively ratcheted down the paragraph, one line at a time.

The hyphenation penalty values associated with each pattern can be determined by reference to a hyphenation penalty table (12). The table can be written into the program itself, encoded into a resource file, or stored in another suitable medium. Alternatively, hyphenation penalties may be calculated by execution of a suitable algorithm. The hyphenation penalties follow one or more of the following trends. The penalties can be directly proportional to the number of hyphens within the hyphenation window. Furthermore, the penalties can be greater for patterns containing consecutive hyphens. The penalties can also be made larger for patterns containing hyphens in closer proximity. Tight clusters of hyphens are thereby assigned large penalties while loose clusters are assigned smaller penalties. The hyphenation penalty table accordingly can be configured so as to factor in not only the number and consecutiveness of hyphens, but also the proximity of non-consecutive hyphens.

For example, the pattern 101100 is assessed a higher hyphenation penalty than is assessed against 1001001 because the hyphens in the former pattern are closer to one another. The pattern 0011000 is assessed a higher penalty than is assessed against 0001001 for the same reason. The pattern 1010101 is assessed a higher penalty than is assessed against 1010100 because the former has a greater total number of hyphens (even though the proximity of the hyphens is the same). It can thus be seen that the penalty increases with the total number of the hyphens, the number of consecutive hyphens, and the proximity of the non-consecutive hyphens.

Preferably, every pattern that ends in zero has a zero penalty, no matter how many ones appear in the pattern. As described in greater detail below, such a configuration results in the assignment of hyphenation penalties only to lines that end in hyphens. However, the system may be usefully configured so as to assign penalties to patterns that end in a zero. In such embodiments, each line is assessed a hyphenation penalty that reflects the proximity and number of hyphens in the adjacent text lines.

Upon identification of a suitable hyphenation penalty table, the hyphenation pattern is reset to zero (14). The reset hyphenation pattern is preferably one bit shorter than the user-selected hyphenation window. The first line of a paragraph is identified and read (16). It is assigned a hyphenation value of 1 if it ends in a hyphen and a value of 0 otherwise (20). The value is added to the right of the hyphenation pattern (20). If the selected hyphenation window is seven lines and the first line of the paragraph ends in a hyphen, a 1 will be added as the least significant bit of the reset hyphenation pattern (i.e., 000000), resulting in a hyphenation patter of 0000001. The hyphenation penalty associated with the hyphenation pattern is determined and assigned to the first line (22). The most significant bit (MSB) is then dropped off of the hyphenation pattern (24). In the example, the resulting truncated pattern would be the six bit sequence 000001.

The technique then identifies the next line of text (26, 28), after which the same penalization procedure is followed. A hyphenation bit is appended to the hyphenation pattern (20) and a hyphenation penalty is assessed (22). If the second line in the paragraph did not end in a hyphen, the resulting hyphenation pattern would be 0000010. That pattern is looked up in the hyphenation penalty table to identify an associated penalty, which is then assigned to the second line (22). The most significant bit is dropped off the pattern (24) and the next line is identified (26, 28). The process 18-28 is repeated until a hyphenation penalty has been assigned to each line in the paragraph.

The hyphenation penalties for each line are then added to obtain an aggregate hyphenation penalty (30) for the entire paragraph. By selection of an appropriate hyphenation penalty table, the aggregate hyphenation penalty can accurately reflect the impact of the hyphenation number, consecutiveness, and/or proximity on the overall aesthetics of the paragraph.

The above-mentioned hyphenation penalty technique may be used advantageously in connection with a paragraph layout optimization program that identifies various possible layouts that include different combinations and permutations of hyphens, line breaks, paragraph shapes, and the like. In such applications, alternate paragraph layouts having different numbers and sequences of hyphenated are identified (32, 34). The penalization protocol (18-28) is performed on each such potential paragraph layout until no other alternate layouts remain (14-34). In so doing, an aggregate hyphenation penalty is assessed to each possible paragraph layout.

Optionally, the line hyphenation penalties or aggregate hyphenation penalties may be combined with penalties associated with other format parameters which are assigned according to known techniques. For example, the aggregate hyphenation penalty may be combined with line break, widow-orphan, and paragraph shape penalties. All such applicable format penalties can be summed to determine a total penalty value, which is in turn assigned to each possible paragraph layout (36). Thereafter the paragraph layout having the best overall appearance can be readily identified by direct comparison of the total penalty values (38).

By use of these techniques, paragraph layouts having an optimal hyphenation layout may be efficiently identified. The optimal layout can optionally be selected based not only on the number and consecutiveness of the hyphens, but also on the degree of hyphenation clustering. The technique described above can be readily combined with other format optimization techniques so as to take multiple other format parameters into account before selecting a final paragraph format.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the present invention have been described. Nevertheless, it will be understood that various modifications may be made without departing from the spirit and scope of the invention. For example, the instant invention may be used to detect the proximity of hyphens without actually assessing any hyphenation penalty. A computer can be programmed to identify a line that ends in a hyphen and thereafter count the number of lines that do not end in hyphens, thereby providing information that is useful as a metric. Accordingly, other embodiments are within the scope of the following claims.

What is claimed is:

1. A computer program product, tangibly stored on a computer-readable medium, for inhibiting hyphenation clustering, comprising instructions operable to cause a programmable processor to:
   identify each text line, in a plurality of consecutive text lines, that ends in a hyphen;
   determine the proximity of at least two non-consecutive lines that end in hyphens; and
   calculate a hyphenation penalty value based on the determined proximity of the at least two non-consecutive lines that end in hyphens.

2. The computer program product of claim 1, further comprising instructions to calculate hyphenation penalty values for multiple pluralities of consecutive text lines.

3. The computer program product of claim 2, wherein the multiple pluralities overlap.

4. The computer program product of claim 2, further comprising instructions to receive input from a user to select the number of text lines in each plurality of consecutive text lines.

5. The computer program product of claim 2, further comprising instructions to calculate an aggregate penalty value, the aggregate penalty value being a function of hyphenation penalties assigned to lines within the multiple pluralities of lines.

6. The computer program product of claim 1, further comprising instructions to assign the hyphenation penalty value to a particular line in the plurality of lines.

7. The computer program product of claim 1, further comprising instructions to calculate a total penalty value, the total penalty value being a function of at least the hyphenation penalty and at least one additional format parameter.

8. The computer program product of claim 1, further comprising instructions to:
   identify an alternate layout in which hyphens occur at the end of different text lines;
   determine the proximity of at least two non-consecutive lines that end in hyphens in the alternate layout; and
   calculate a second hyphenation penalty value based on the determined proximity of at least two non-consecutive hyphens within a plurality of consecutive text lines in the alternate layout.

9. The computer program product of claim 8, further comprising instructions to a) calculate a total penalty value based on the second hyphenation penalty and at least one additional format parameter and b) identify the layout having the lowest total penalty value.

10. The computer program product of claim 1, wherein a hyphenation penalty value for a plurality of consecutive lines with a first determined proximity of at least two non-consecutive lines that end in hyphens is different than a hyphenation penalty value for a second, different determined proximity of at least two non-consecutive lines in the plurality of consecutive lines that end in hyphens.

11. A computer program product, tangibly stored on a computer-readable medium, for inhibiting hyphenation clustering, comprising instructions operable to cause a programmable processor to:
   a) identify a line in a paragraph;
   b) modify a pattern sequence to reflect the presence or absence of a hyphen at the end of the line;
   c) determine the proximity of at least two non-consecutive lines that end in hyphens;
   d) assign a hyphenation penalty to the line based on the determined proximity of non-consecutive lines that end in hyphens reflected by the pattern sequence;
   e) identify the next line in the paragraph; and
   f) repeat steps b) through e) until the end of the paragraph is reached.

12. A computer-implemented method for inhibiting hyphenation clustering in a layout process for text lines, comprising the steps of:
   identifying each text line, in a plurality of consecutive text lines, that ends in a hyphen;
   determining the proximity of at least two non-consecutive lines that end in hyphens;
   calculating a hyphenation penalty value based on the determined proximity of the at least two non-consecutive lines that end in hyphens; and
   selecting an optimal layout for the plurality of consecutive text lines based on the calculated hyphenation penalty value.

13. The computer-implemented method of claim 12, further comprising the step of calculating hyphenation penalty values for multiple pluralities of consecutive text lines.

14. The computer-implemented method of claim 13, wherein the multiple pluralities overlap.

15. The computer-implemented method of claim 13, further comprising the step of receiving input from a user to select the number of text lines in the plurality of consecutive text lines.

16. The computer-implemented method of claim 12, further comprising the step of assigning the hyphenation penalty value to a particular line in the plurality of lines.

17. The computer-implemented method of claim 16, further comprising the step of calculating an aggregate penalty value, the aggregate penalty value being a function of hyphenation penalties assigned to lines within the multiple pluralities of lines.

18. The computer-implemented method of claim 12, further comprising the step of calculating a total penalty value, the total penalty value being a function of at least the hyphenation penalty and at least one additional format parameter.

19. The computer-implemented method of claim 12, further comprising the steps of:

identifying an alternate layout in which hyphens occur at the end of different text lines; and determining a second hyphenation penalty value based on the determined proximity of at least two non-consecutive hyphens within a plurality of consecutive text lines in the alternate layout.

20. The computer-implemented method of claim 19, further comprising the steps of a) calculating a total penalty value based on the second hyphenation penalty and at least one additional format parameter and b) identifying the layout having the lowest total penalty value.

21. A computer-implemented method for inhibiting hyphenation clustering in a paragraph layout process, comprising the steps of:
  a) identifying a line in a paragraph;
  b) modifying a pattern sequence to reflect the presence or absence of a hyphen at the end of the line;
  c) determining the proximity of at least two non-consecutive lines that end in hyphens;
  d) assigning a hyphenation penalty to the line based on the determined proximity of non-consecutive lines that end in hyphens reflected by the pattern sequence;
  e) identifying the next line in the paragraph;
  f) repeating steps b) through e) until the end of the paragraph is reached; and
  g) employing assigned hyphenation penalties to select one of a plurality of possible paragraph layouts.

22. A computer program product, tangibly stored on a computer-readable medium, for inhibiting hyphenation clustering, comprising instructions operable to cause a processor to perform operations comprising:
  identifying a hyphenation window comprising text in one or more paragraphs;
  determining a layout of text within the hyphenation window, the layout comprising a plurality of consecutive text lines;
  identifying each text line, in the plurality of consecutive text lines, that ends in a hyphen;
  determining proximity of at least two non-consecutive text lines, in the plurality of consecutive lines, that end in hyphens; and
  calculating a hyphenation penalty value based on the determined proximity of the at least two non-consecutive lines that end in hyphens.

23. The computer program product of claim 22, wherein identifying a hyphenation window comprises receiving input from a user and identifying the hyphenation window based on the received input.

24. The computer program product of claim 22, wherein the operations further comprise:
  determining a second layout of text, the second layout of text comprising a second plurality of consecutive text lines;
  identifying each text line, in the second plurality of consecutive text lines, that ends in a hyphen;
  determining proximity of at least two non-consecutive text lines, in the second plurality of consecutive text lines, that end in hyphens;
  calculating a second hyphenation penalty value based on the determined proximity of the at least two non-consecutive lines, in the second plurality of consecutive text lines, that end in hyphens; and
  comparing the hyphenation penalty value to the second hyphenation penalty value.

25. The computer program product of claim 24, further comprising selecting an optimum layout from either the layout of text or the second layout of text, based on comparing the hyphenation penalty value to the second hyphenation penalty value.

\* \* \* \* \*

UNITED STATES PATENT AND TRADEMARK OFFICE
CERTIFICATE OF CORRECTION

PATENT NO.       : 7,401,290 B2                              Page 1 of 1
APPLICATION NO.  : 09/799195
DATED            : July 15, 2008
INVENTOR(S)      : Matthew A. Wormley It is certified that error appears in the above-identified patent and that said Letters Patent is hereby corrected as shown below:

Title page, left-hand column:

item (12) United States Patent:
        delete "Wormely", and replace with --Wormley--

Title page
    item (54) Title of Application and Col. 1:
        delete "HYPENATION", and replace with --HYPHENATION--
        delete "PARAGRAPHS", and replace with --PARAGRAPH--

Title page
    item (75) Inventor:
        delete "Wormely", and replace with --Wormley--

Signed and Sealed this

Tenth Day of February, 2009

JOHN DOLL
*Acting Director of the United States Patent and Trademark Office*